United States Patent
Weihrauch

(10) Patent No.: US 7,226,555 B2
(45) Date of Patent: Jun. 5, 2007

(54) METHOD FOR THE PRODUCTION OF A BRISTLE STRUCTURE ON A CARRIER

(75) Inventor: Georg Weihrauch, Wald-Michelbach (DE)

(73) Assignee: Geka Brush GmbH, Bechhofen-Waizendorf (DE)

( * ) Notice: Subject to any disclaimer, the term of this patent is extended or adjusted under 35 U.S.C. 154(b) by 168 days.

(21) Appl. No.: 10/513,758

(22) PCT Filed: May 12, 2003

(86) PCT No.: PCT/EP03/04938

§ 371 (c)(1),
(2), (4) Date: Nov. 9, 2004

(87) PCT Pub. No.: WO03/097324

PCT Pub. Date: Nov. 27, 2003

(65) Prior Publication Data

US 2005/0172439 A1 Aug. 11, 2005

(30) Foreign Application Priority Data

May 15, 2002 (DE) .................................. 102 21 869

(51) Int. Cl.
*B29C 45/14* (2006.01)
(52) U.S. Cl. .................... 264/163; 264/243; 264/273
(58) Field of Classification Search ................. 264/163, 264/243, 328.1, 273
See application file for complete search history.

(56) References Cited

U.S. PATENT DOCUMENTS

| 2,415,961 A | 2/1947 | Nast |
| 2,621,369 A | 12/1952 | Gantz |
| 4,956,139 A | 9/1990 | Koizumi |

FOREIGN PATENT DOCUMENTS

| DE | 941 364 | | 3/1956 |
| DE | 28 56 618 | | 11/1980 |
| DE | 100 33 256 | | 1/2002 |
| EP | 0 492 052 | | 7/1992 |
| FR | 2 046 347 | | 3/1971 |
| FR | 2046347 | * | 3/1971 |
| GB | 2 151 971 | | 7/1985 |
| JP | 04 06 2119 | | 6/1992 |
| JP | 2003 053776 | | 2/2003 |
| WO | WO 02 03 831 | | 1/2002 |

* cited by examiner

*Primary Examiner*—Jill L. Heitbrink
(74) *Attorney, Agent, or Firm*—Browdy and Neimark, PLLC

(57) ABSTRACT

A method for the production of bristles structures on an arbitrary kind of carrier using a mold tool is described having channels extending from channel walls for shaping bristles, wherein a mold mass for forming the bristles is introduced under pressure into the channels, preferentially using the injection molding technique. Towards this end, the carrier is disposed directly or indirectly onto the mold walls of the channels in such a fashion that the free cross-section of the channels is completely covered and the mold mass is subsequently introduced onto the carrier with a sufficient mold pressure (injection pressure) that the carrier is broken-through in the vicinity of the free cross-section of the channels thereby displacing the carrier material, with the carrier mass subsequently filling the channels.

39 Claims, 9 Drawing Sheets

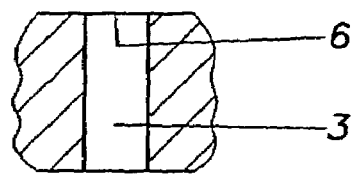
Fig.5
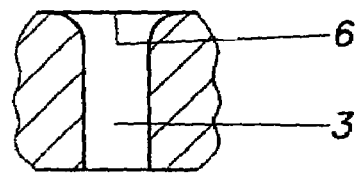 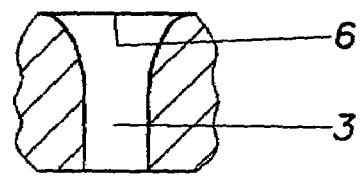
Fig.6    Fig.7
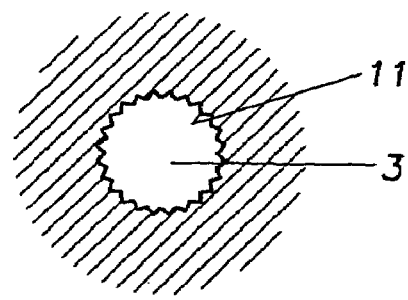
Fig.8
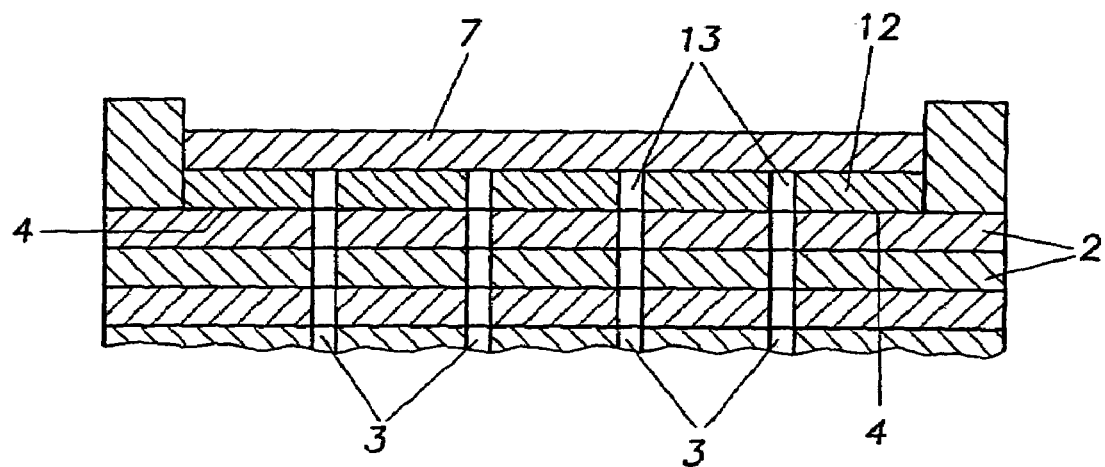
Fig.9

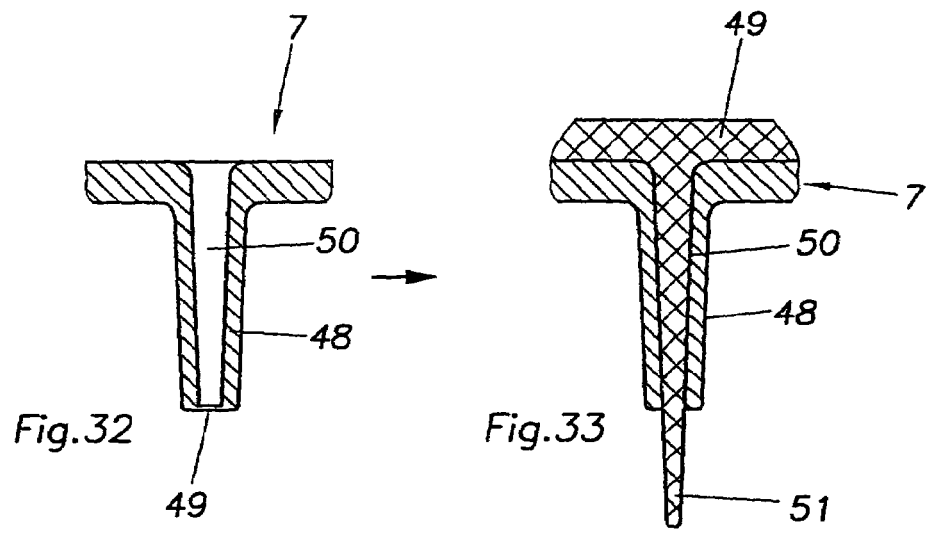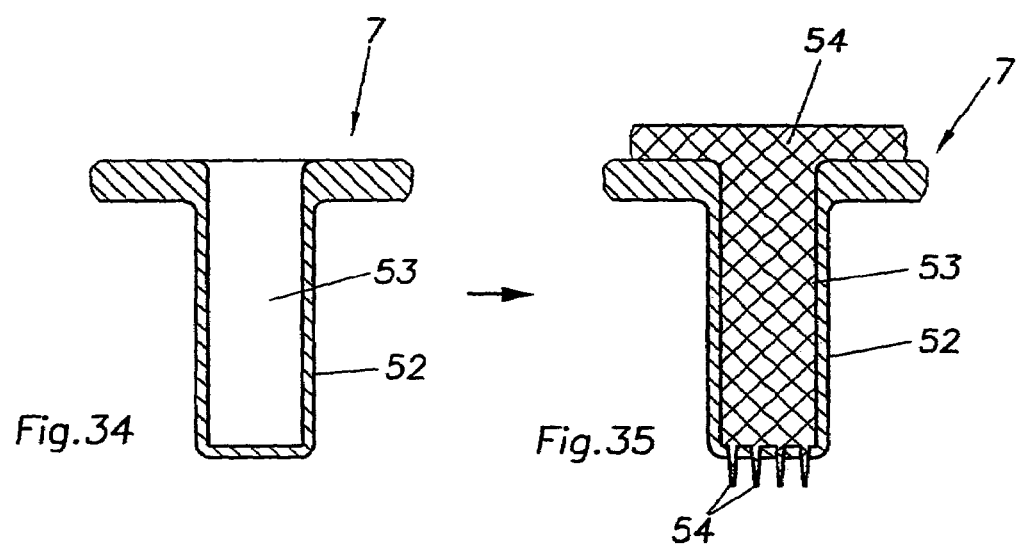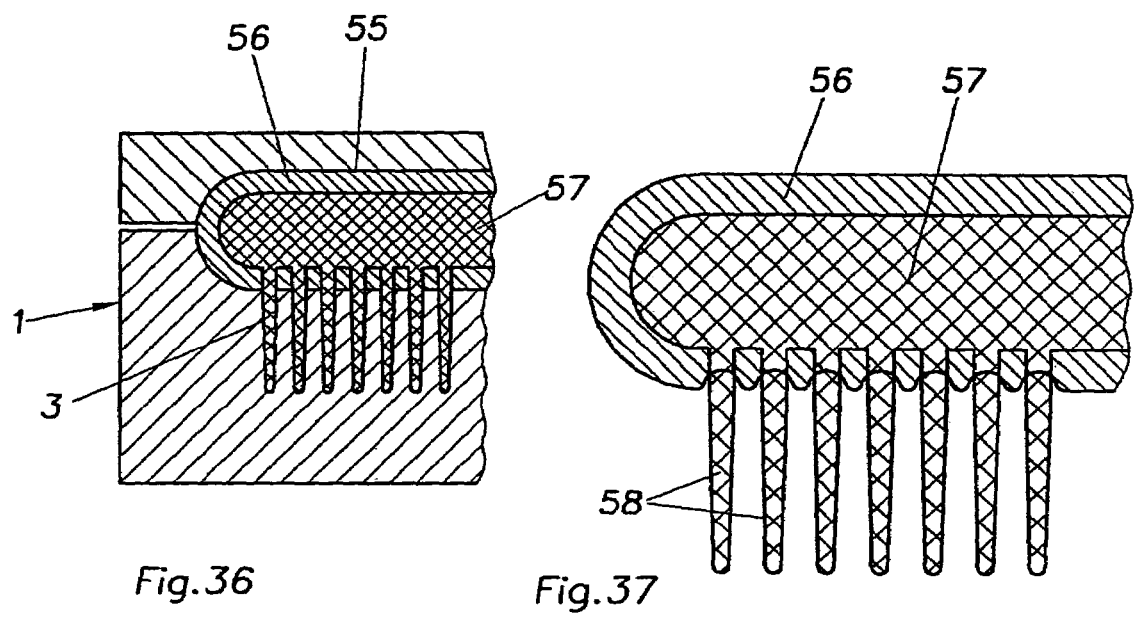

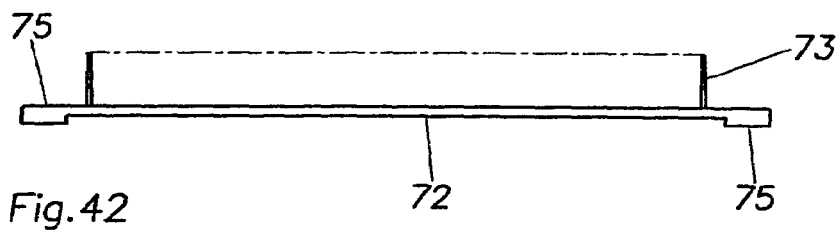
Fig.42
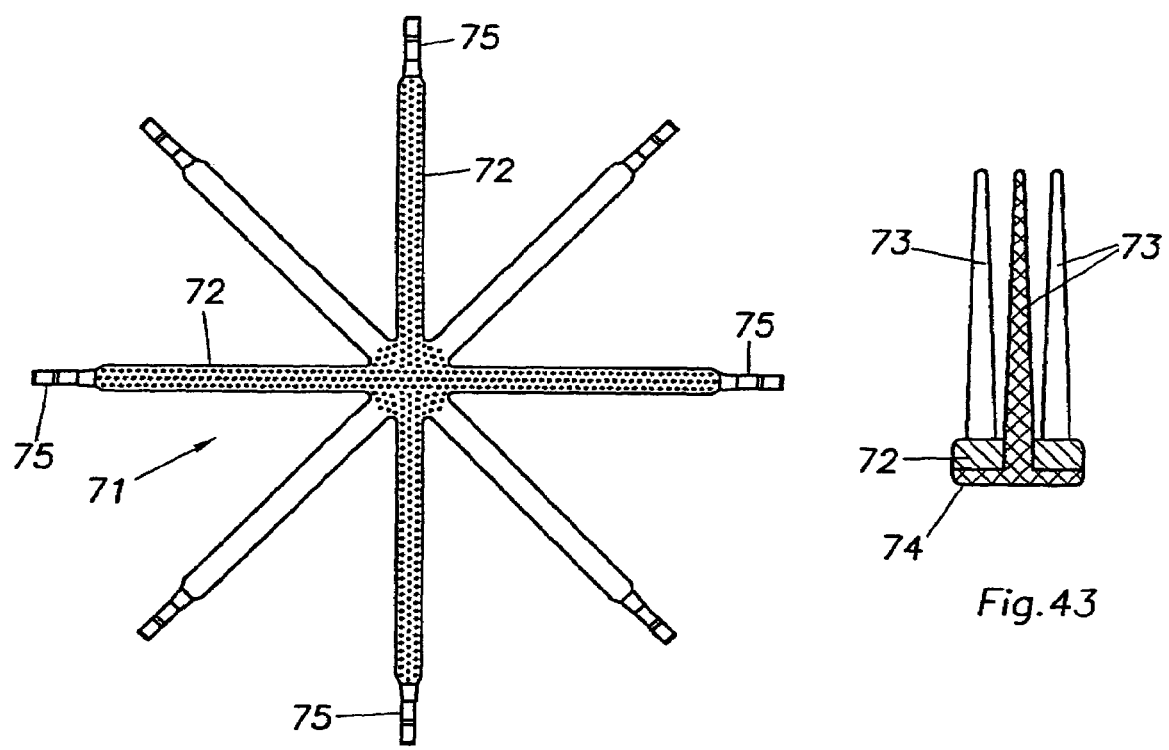
Fig.41
Fig.43

METHOD FOR THE PRODUCTION OF A BRISTLE STRUCTURE ON A CARRIER

This application is the national stage of PCT/EP03/04938 filed on May 12, 2003 and also claims Paris Convention priority of DE 102 21 869.2 filed May 15, 2002.

BACKGROUND OF THE INVENTION

The invention concerns a method for manufacturing a bristle structure on an arbitrary kind of carrier using a molding tool having channels, extending from a mold wall, for the molding of bristles, wherein a mold mass for forming the bristles is introduced into the channels under pressure.

Bristle products which include, in particular, brushes of every kind, paint brushes as well as brooms are predominantly produced using mechanical methods with which the bristle carrier is initially made having holes and the bristle bundles are mechanically inserted at a subsequent time. With the advent of plastics the brush bodies are manufactured through injection molding or molding processes and the bristles are attached either in the conventional mechanical fashion or, recently, using thermal techniques. In all such cases the bristles monofilaments must initially be produced using an extrusion or a spinning process with the monofilaments being optionally cut and the bristles subsequently attached to the carrier. The anchor technique, which is predominantly used in current processes, entails looping the bristles and punching the bristles, together with an anchor made from metal, into the brush body.

For these reasons there have been a plurality of attempts to render production processes more efficient by shaping the bristles or bundles together with a carrier as a single piece and to subsequently bond the carrier to the brush body. More than 100 years ago (GB 788/1861, GB 24935/1896) individuals have proposed molding the bristles along with a carrier binding same from an elastic material such as rubber or the like and subsequently attaching the structure to a rigid brush body. DE 941364, GB 2,151,971, U.S. Pat. No. 3,016,44, U.S. Pat. No. 4,244,076, U.S. Pat. No. 5,040,260, U.S. Pat. No. 5,966,771 and WO 98/03097 propose the production of cleaning elements bundled into groups together with a carrier binding same in an injection molding process and binding the carrier to a brush body at a subsequent time or using a two-component injection mold. U.S. Pat. No. 5,926,900 proposes the manufacture of the entire brush body together with the bristles as an integral injection molded member.

Bristles of this type can, for practical reasons, only be utilized in limited applications e.g. for hair care or as throwaway brushes. The reason for the deficient applicability and lack of acceptance is the fact that bristles which are injection molded have a fatigue strength under reverse bending stresses which is inadequate because, in contrast to bristles which are extracted from a spinning process, they do not have the molecular structure which is necessary for stability and which is primarily distinguished by a longitudinal orientation of the molecular chains, parallel to the bristle. For this reason they are most appropriately designated as working or cleaning elements than as bristles. Inadequate stability is in particular present in the shoulder region of the working elements proximate the carrier since an orientation of the molecules is nearly completely absent at this location. In consequence thereof, the working elements, which are initially properly oriented directly following manufacture, change their position after short periods of use, in particular through bending, kinking, or failure to return to an upright position (bend recovery). Moreover, these techniques require use of one and the same plastic for the working elements and for the carrier, which, for high quality plastics from which bristles having high quality requirements must be made, leads to corresponding increase in costs. Attempts to reduce costs require a compromise in the choice of plastic. Nevertheless, the substantial disadvantages in applications remain in consequence of which these types of brushes are only suitable for limited applications. Moreover, there is no possibility for adaptation of the material used for the carrier and the brushes in response to individual requirements or for differences among the bristles, in particular with regard to mechanical stability, material specific coefficients of friction, color etc.

U.S. Pat. No. 2,621,639 discloses brushes with which the working elements (pins) are not bristles in the traditional sense rather pins, rods, strips or the like. These working elements are injection-molded elements, which are predominantly made from rubber or rubber elastic plastics such as elastomers and have large cross-sections and also shorter lengths than most bristles. These structural restrictions for the "bristles" are dictated by two facts. First of all, only in this manner can a moderately satisfactory stability and fatigue strength under reversed stresses be achieved. Second of all, for injection molding technical reasons, the molding channels cannot be sufficiently narrow and deep in order to guarantee proper filling of the mold and as well as to facilitate removal from the mold. The characteristic feature of these "pins" is substantially a soft action on the surface that is treated by the elements with an increased coefficient of friction to effect a kind of rubbing or massaging effect but not an active brushing action. Typical applications are hair brushes which are predominantly used for separation and ordering of the hair and which are intended to only massage the scalp. The stiffness of these elements can only be substantially influenced by the diameter, the ratio of the diameter to the length, and by the hardness of the plastics used.

The brushes according to U.S. Pat. No. 2,621,639 are produced by injection molding. A flexible thin carrier plate having perforations corresponding to the configuration of the working elements is introduced into an injection mold having a plurality of channel-like molding cavities which are adjacent to the perforation holes in the carrier and which serve to shape the pin shaped working elements. Distributor channels are disposed on the opposite side (injection side) and serve to pass the liquid plastic melt, e.g. nylon, to the individual perforation holes and into the adjacent molding channels. The molding channels initially have a widening in direct proximity to the perforations in the carrier. In this manner, a bulge is produced on both sides of the thin carrier plate so that the working elements are axially secured in both directions. Despite the fact that nylon would be theoretically appropriate to produce bristle-like properties, this does not occur, since a longitudinally oriented molecular structure cannot be effected, at least at the foot of the cleaning element due to the bulge. A similar situation obtains for another conventional hair brush (EP-B1-0120229) with which a carrier with bushing shaped conical shoulders is initially injected and an additional plastic is subsequently injected into the bushings to form a core and seats with an enlargement at the opening mouth of the bushing. The cores are bound together at the back side with a second carrier plate made from an appropriate material to effect a positive, axially secure connection between both components as the principle goal. As a result, the working elements become even more bulky.

Such cleaning elements have also been proposed for tooth brushes and for brooms (U.S. Pat. No. 5,040,260, U.S. Pat. No. 5,966,771). These brushes are structured from two components. U.S. Pat. No. 1,924,152, U.S. Pat. No. 2,139,242, DE 826440, and WO 0/64307 have proposed combining a bristle stock made from conventional bristles and having their recognized and cleaning properties with rod or pin-like cleaning elements made from rubber elastic plastic.

WO/03831 (DE 10033256 and DE 10130863), assigned to the same party as the instant application and the complete disclosure of which are hereby incorporated by reference, describe a procedure and a device with which the well-known advantages of injection molded technology can be utilized. Nevertheless, the production process is not suitable for bristle products having bristles of quality and application properties that are comparable to those of spin extruded bristles and certainly not better or improved with respect thereto. The carrier is thereby produced having openings in the form of spinning nozzles, wherein the openings, to which the channels are adjacent, have a minimal width of less than or equal to 3 mm, at least over a portion of their length, wherein the ratio between this width and the flow path of the melt given by the combined height of the openings and the length of the channels is chosen to be less than or equal to 1:5, with the plastic melt being injected from at least one side of the carrier (the introductory side of the melt) and through the openings to form the bristles in the channels. The above mentioned ratio is preferentially chosen to be less than or equal to 1:10. The lower limit of this ratio can lie in the range of 1:250.

This latter procedure constitutes an entirely new approach for manufacturing bristle products. The carrier on which the bristles are disposed which can constitute the brush body itself or a portion thereof, e.g. in the form of an insert or the like, simultaneously serves as a lost or incorporated "tool" for the production of the bristles by injection molding. Blockage effects and wall friction lead to an extensional flow having relatively large sheer forces proximate the walls at the "spinning nozzle" openings. This causes the molecular structure within the mold to become oriented in the flow direction with this orientation continuing into the channels forming the bristles, wherein the ratio between the flow path length for the melt chosen in accordance with that invention and the size of the most narrow region of the openings, optimizes the longitudinal molecular orientation. This self-reinforcement of the bristles in response to longitudinal orientation of the molecular chains is particularly apparent for partial crystal thermoplastics. Moreover, bristle products produced in this fashion have, in contrast to bristles produced in an integral fashion, a short partial length of the bristle (the root) disposed within the carrier and supported thereby. This root region is the most sensitive portion with respect to strength since the orientation of the molecules at this location is inadequate. This stabilization leads to a higher fatigue strength under bending stresses, in particular in response to reverse bending stresses, in additional to a higher tensile strength. Compared to conventional one piece injected bristle products, the above mentioned factors provide for an increase of 40% or more in the bending forces which are necessary to procure a given deflection of the bristle. The module of elasticity is also increased substantially. Since the tensile strength is also substantially increased, these bristles can be easily removed from the mold, even when they have narrow cross-sections and large lengths.

The conventional procedure in accordance with WO 02/03831, assigned to the assignee of the instant invention, can be used, in principle, with all flowable plastics, wherein in view of the requirements for bristles, thermoplastics or thermo elastics or mixtures thereof (alloys) are preferably utilized, since such plastics allow for the most prominent degree of molecular orientation.

The previously mentioned procedure, due to the assignee, as well as the procedure in accordance with U.S. Pat. No. 2,621,369 have the disadvantage that the hole pattern in the prefabricated plastic carrier must identically match the predetermined grid defined by the channels in the molding tool. In particular, the axes of the openings and the channels must be aligned. In the event that this requirement is not precisely maintained, shifts occur in the region of the brush anchoring leading to an undesirable decrease in the cross-section at the foot of the bristle so that the bristle tears off or sheers off prematurely. On the other hand, the bristle carrier having the predetermined holes and made from plastic can only be produced in a relatively economical fashion using the injection molding procedure. However, injection molding nearly invariably leads to a shrinkage in the carrier not only due to the cooling process but also due to post-shrinkage over a subsequent extended period of time as a result of which the initial geometry is lost. Moreover, one is restrained to use of low shrinkage plastics and is therefore substantially restricted with respect to the material combinations for the bristles and carrier. If one desires to facilitate an increased range of material for the bristle carrier combination and, in particular, for the material of the carrier, it may be necessary to provide for a plurality of injection molding tools.

It is the underlying purpose of the present invention to propose a method with which a reproducible bristle structure of constant quality can be produced using arbitrary carrier materials.

SUMMARY OF THE INVENTION

The invention therefore concerns a method for the production of a bristle structure on an arbitrary kind of carrier using a molding tool having channels for forming the bristles extending from a mold wall, wherein a mold mass is injected under pressure into the channels. Such a method is characterized in accordance with the invention in that the carrier is disposed directly at or proximate to the mold wall having the channels in such a fashion that the free cross-section of the channels is completely covered and the mold mass is subsequently injected, with a sufficient molding pressure, onto the carrier in such a fashion as to shoot through the carrier in the vicinity of the free cross-sections of the channels while displacing the material of the carrier, with the mold mass subsequently filling the channels.

The method in accordance with the invention therefore utilizes an original carrier material that, in particular, does not exhibit openings, which must be aligned with the channels forming the bristles. On the contrary, the molding pressure is utilized to produce the through-holes having the required cross-section during the molding procedure itself in that the molding mass is injected through the carrier via the molding pressure. The material covering the free cross-section of the channels is thereby displaced in a sideward direction and also in the "shooting direction". The hole pattern is only produced in the arrangement dictated by the channels and during formation of the bristles so that the problem of alignment of the holes with respect to the channels is avoided as is the problem of having one-to-one correspondence between the configuration of the holes and the channels so that expensive tools for producing a carrier having holes can be avoided.

The method in accordance with the invention is not constrained to injection molding. On the contrary, a liquid or plastic mass can be utilized as the molding mass and can be introduced into the molding tool to penetrate through the carrier in the vicinity of the free cross-sections in response to the molding pressure while displacing the carrier material and pressing same into the channels.

The method in accordance with the invention therefore permits processing of not only thermoplastic plastics but also duroplastic masses in plastic form which first cure and harden following the molding procedure. Also appropriate are liquid plastics that, for example, are used for molded candles.

A viscous elastic mass can also be used as a mold mass for the bristles which is introduced into the molding tool and which penetrates through the carrier in the vicinity of the free cross-sections of the channels in response to the molding pressure, wherein the carrier material is displaced and pressed into the channels. In this manner, even elastomers or other rubber-like masses such as latex can be used as the carrier materials while nevertheless guaranteeing that the carrier is only perforated at those locations at which a bristle shaping channel is located.

The molding mass can also be introduced into the molding tool in the form of a solid mass which is plastically deformable under technically feasible pressures, i.e. up to 5,000 bar ($5 \times 10^5$ kPa). In response to the molding pressure, the plastic mass shoots through the carrier in the vicinity of the free cross-sections of the channels and displaces the carrier material sidewardly and/or in the "shooting direction" before it is pressed into the channels.

In the above mentioned procedure, the molding of the molding mass can optionally be supported by the introduction of heat. This is particularly advantageous when the molding mass comprises reactive components such as duroplastics, in order to accelerate hardening and curing.

The method is particularly advantageous when the molding mass for the bristles is a melt, which is shot through the carrier in the vicinity of the free cross-sections of the channels in response to injection molding or pressure molding, and with the carrier material being displaced into the channels. Towards this end, specific molding pressures between 1,000 and 5,000 bar ($1 \times 10^5$ kPa to $5 \times 10^5$ kPa) have turned out to be advantageous, wherein a pressure in excess of 300 to 600 bar ($0.3 \times 10^5$ to $0.6 \times 10^5$ kPa) is achieved in the channels molding the bristles, which is sufficient for adequate filling of the mold even in the event of narrow channels. In response to injection molding and pressure molding, penetration through the carrier leads to differing effects. The actual melt front is preceded by a pressure wave, which displaces the air in the molding tool. This air pressure wave, which also has an increased temperature, is initially incident on the carrier before the actual melt front.

Since, in accordance with the method of the invention, bristles structures can be produced with arbitrary carrier materials, the only important point to take into consideration is the adjustment of the molding pressure in dependence on the thickness and the material properties of the carrier in such a fashion that the carrier is perforated in the region of the openings of the channels in response to that pressure.

The carrier material, which is displaced by the mold mass in response to penetration through the carrier, can be at least partially displaced into the openings in the channels to thereby form collars, which wrap around the individuals bristles in the vicinity of the bristle foot.

Moreover, the pressure can be regulated in dependence on the choice of materials for the carrier in such a fashion that the carrier material displaced in response to the passage of the molding mass through the carrier forms a funnel-shaped hole, similar to an injection funnel.

In order to prevent the formation of such a collar from weakening the cross-section of the bristle in the foot region, one can also provide the channels, which shape the bristles with an enlargement in the vicinity of their openings for acceptance of the carrier collar material. In this manner, the molecular structure of the bristle can develop in an unencumbered fashion and, in particular, the desired longitudinal molecular orientation of the bristles can be achieved.

The carrier material can also be selected in such a fashion that the carrier material that is displaced by the mold mass during penetration through the carrier forms an alloy together with the mass forming the bristles in order to give the bristles certain characteristics.

Prior to disposition on the mold walls, the carrier is preferentially processed to effect weak material structures in the vicinities of the regions covering the openings to the channels. These could constitute simple thinning of the carrier, bottom holes or even symmetric, radially disposed intended breaking locations.

In one variation of the embodiment, an additional carrier can be inserted into the molding tool upstream of the channels, which has aligned holes, wherein the carrier which is to be penetrated by the molding mass can be disposed thereon to cover the holes of the additional carrier. In this particular case, the free cross-sections of the channels forming the bristles do not, in and of themselves, define "the perforation template" rather one has the additional influence of the holes of the additional carrier which lengthens the molding region. The carrier material that is displaced by the mold mass forming the bristles during penetration thereby is displaced into the holes of the additional carrier as a result of which a particularly good bandaging of the bristles in the bristle foot region is achieved.

The configuration can also be selected in such a fashion that the carrier covering the free cross-sections of the channels is directly adjacent to the walls defining the channels, with the additional carrier being disposed thereon so that a kind of "hole puncher" is generated to simplify penetration through the carrier.

In an additional feature which also simplifies penetration through the carrier, the opening edge of the channels forming the bristles can be structured and map into a smooth wall in a downstream direction thereof.

The carrier covering the free cross-sections of the channels, particular for injection molding of the mass, serves the additional function of constituting a pressure-containing barrier such that the usual pressure gradient generated during injection molding, which extends from the injection molding device into the molding cavity, is interrupted by brief blockage of the molding mass at the carrier material so that the molding mass subsequently penetrates into the channels with sufficiently high specific pressure to shape the bristles. Practical experiments have shown that a specific-injection pressure in front of the injection screw of 2,100 bar ($2,1 \times 10^5$ kPa) can drop down to approximately 600 bar ($0.6 \times 10^5$ kPa) in the inner cavity. When the channels are covered with the carrier, the pressure within the mold can be kept approximately at the specific injection pressure in front of the screw. The compressibility of thermoplastic melts of up to 10% supports the pressure maintenance prior to penetration through the carrier. This leads to an advantageous high flow velocity of the injection molding mass into the channels forming the bristles and to associated increased sheering effects and therefore good longitudinal orientation while forming needle-like crystals with thermoplastic materials. The quality of the manufactured bristles can therefore be influenced by the thickness of the carrier and the pressure maintenance within the mold given thereby. For appropriate high inner mold pressures, the penetration of the melt into the channels forming the bristles transpires in an explosion-like fashion. Optimized method parameters and constructive techniques can be extracted from the unpublished patent application of the assignee to the instant patent application (DE 10201635.5 filed Jan. 17, 2002 and DE 10212781.8 filed Mar. 21, 2002) the complete disclosure of which are hereby incorporated by reference.

As already mentioned, the carrier can be made from an arbitrary material, in particular from an organic or inorganic material.

The carrier can be a foil, preferentially a stretching foil that forms a leak-tight seal in the vicinity of the bristle shoulder during penetration. The carrier can also be a metallic foil, which can perform a decorative and/or chemical or physical function in the finished bristle product in dependence on the application therefor.

Alternatively, the carrier can also be made from a plastic foil, in particular from an elastomer foil to provide the finished brush product with application-specific properties at the bristle side.

Foils having a thickness of $\leq 1$ mm are preferentially utilized, having prepared intended breaking locations, which are perforated at corresponding molding pressures.

The carrier can also be formed from a plate having a thickness of preferentially $\geq 0.2$ mm.

The carrier can also be made from laminated foils and/or foils having two or more layers, wherein a very thin outer layer is preferentially provided which simplifies conformance of bristle carrier to the inner shape of the molding tool. The advantages of such a configuration are described below in connection with further method variations.

In the case of a carrier having two or more layers, at least one of the layers can cover the openings in the channel and at least an additional layer can have preformed holes in correspondence to the configuration of the channels.

The two or more layers are preferentially made from different plastics with preferentially differing elasticities.

The carrier can be introduced into the opened molding tool as a prefabricated molding member. It can, for example, be a blown molding member, an injection member, or a deep drawn article.

The carrier can also be introduced into the opened molding tool in the form of an endless material and be cut to the intended dimensions prior to or when the mold is closed. Alternatively, a carrier having the desired dimensions can be introduced onto an endless support and can be separated from the support in the vicinity of the molding tool.

Moreover, the material of the carrier covering the free cross-section of the channels can be welded to the material of the bristles. This can be realized with a plurality of possible plastic combinations.

The method in accordance with the invention also permits section wise introduction of plastics having different mechanical properties into the molding tool to form the bristles so that the overall bristle structure is built up from bristles having differing properties. Moreover, bristle plastics having different colors can be introduced into the molding tool in sections to provide different types of bristle fields with different visual appearances.

The method in accordance with the invention always leads to individually standing bristles with close separations from each other in dependence on the configuration of the bristle forming channels. This bristle structure of individually standing bristles has turned out to be particularly advantageous for brushes and paintbrushes having stringent requirements with respect to hygiene, since soilage or media which are applied by the brush or the paintbrush do not accumulate between the bristles to the extent that they do with bristles bundles. Moreover, such bristles or brushes can be rinsed and cleaned in a straightforward and thorough fashion.

In another embodiment of the method, the carrier material is introduced into the molding tool in the form of a blank or raw molding member and is shaped at the walls of the mold surrounding the free cross-sections of the channels in response to the molding pressure of the molding mass before the molding mass penetrates through the shaped carrier. In this case, the final shape of the carrier is first produced within the molding tool in response to the molding pressure of the mold mass. In particular, thin foil-like carriers and optionally two layered ones are particularly suitable for this application.

In another variation, the carrier material can be introduced into the molding tool in the form of a raw molding member or blank and fluid pressure can shape it against the mold walls surrounding the free cross-sections of the channels before the mass generating the bristles is introduced into the molding tool at an increased molding pressure. This auxiliary fluid only serves a shaping purpose and is either removed from the molding tool prior to injection of the molding mass or is displaced out of the molding tool in response to the subsequent injection of the molding mass itself.

Alternatively, the carrier material and the molding mass forming the bristles can be introduced into the molding tool using the sandwich injection molding procedure. This can be effected in either single or twin-shot methods.

The GIT method (gas injection technology) and the WIT method (water injection technology) are both suitable for shaping the carrier material using an auxiliary fluid.

BRIEF DESCRIPTION OF THE DRAWING

The invention is described below with reference to a plurality of embodiments.

FIG. 5 shows a first highly enlarged cut in the vicinity of the free opening cross-sections of the molding channel;

FIG. 6 shows a second highly enlarged cut in the vicinity of the free opening cross-sections of the molding channel;

FIG. 7 shows a third highly enlarged cut in the vicinity of the free opening cross-sections of the molding channel;

FIG. 8 shows a plan view onto the free cross-section of another embodiment of the molding channel;

FIG. 9 shows a cut through a molding tool for processing a carrier having a plurality of layers;

FIG. 32 shows a detailed cut of a carrier having a shaping shoulder;

FIG. 33 is the carrier in accordance with FIG. 32 subsequent to introduction of the molding mass;

FIG. 34 is a detail of an embodiment, which is changed with respect to FIG. 32;

FIG. 35 is the embodiment of FIG. 34 following introduction of the mold mass;

FIG. 36 is a schematic representation of the sandwich molding procedure using the mono method;

FIG. 37 shows the article produced using the method in accordance with FIG. 36;

FIG. 41 shows a star-shaped blank made from strip-shaped bristles elements, in plan view;

FIG. 42 shows a side view of a portion of the blank in accordance with FIG. 41; and FIG. 43 shows a cut through the strip-shaped blank.

DESCRIPTION OF THE PREFERRED EMBODIMENT

Figure 1:
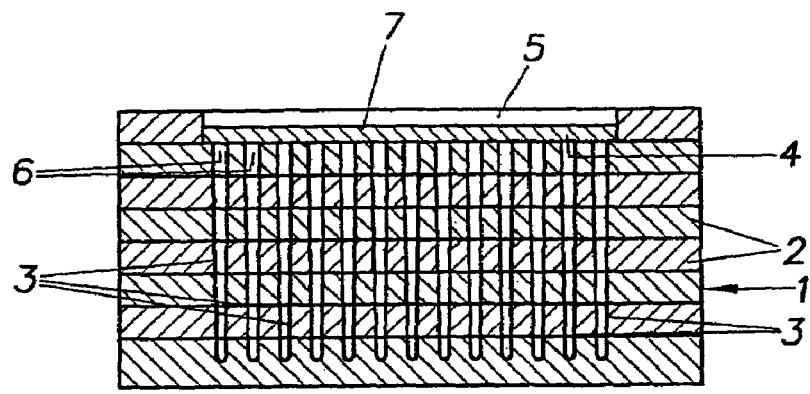
FIG. 1 shows a schematic representation of a molding tool in a first method step.

FIG. 1 schematically shows a molding tool 1, or a portion thereof, which is preferentially not of solid construction, rather is built up from parallel layered plates 2 whose purpose and action are described more closely in WO 02/03831 (DE 10033256 and DE 10130863) and in the unpublished patent applications DE 10301635.6 and DE 10212781.8, both due to the assignee of the instant application. The mold tool has a tool portion 1 having a plurality of preferentially parallel channels 3 in which the bristles are molded. The channels 3 extend from mold walls 4 and preferentially travel in a slightly conical fashion towards their closed ends. A carrier 7 is inserted into the mold cavity 5 onto the molding walls 4 and covers the free cross-section 6 of the molding channels 3.

Figure 2:
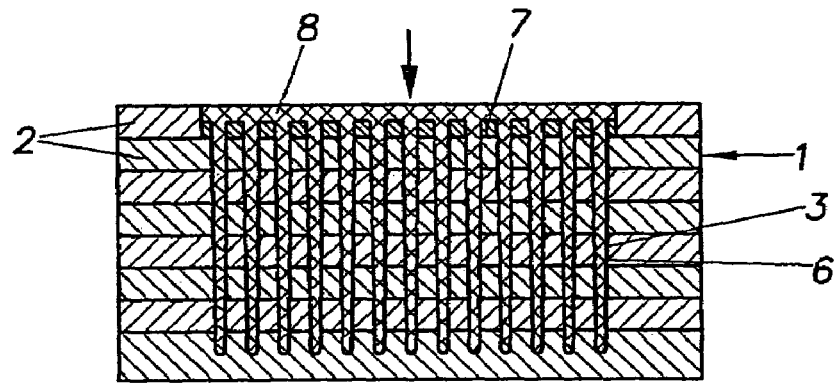
FIG. 2 shows the molding tool of figure 1 in a second method step.

The mold tool can be an injection molding, a pressure molding or a press-molding tool. The mold mass for the bristles is introduced into the mold cavity 5 with a sufficient amount of pressure to penetrate or shoot through the carrier 7 in the vicinity of the free cross-section 6 of the mold channel 3 (see FIG. 2). After penetration or shooting-through of the carrier 7 the mold mass forming the bristle 6 in the channels 3 can simultaneously serve to form the back of the carrier 7 (reference symbol 8) to cover same and thereby form a complete carrier of a bristle element.

Figures 3, 4:
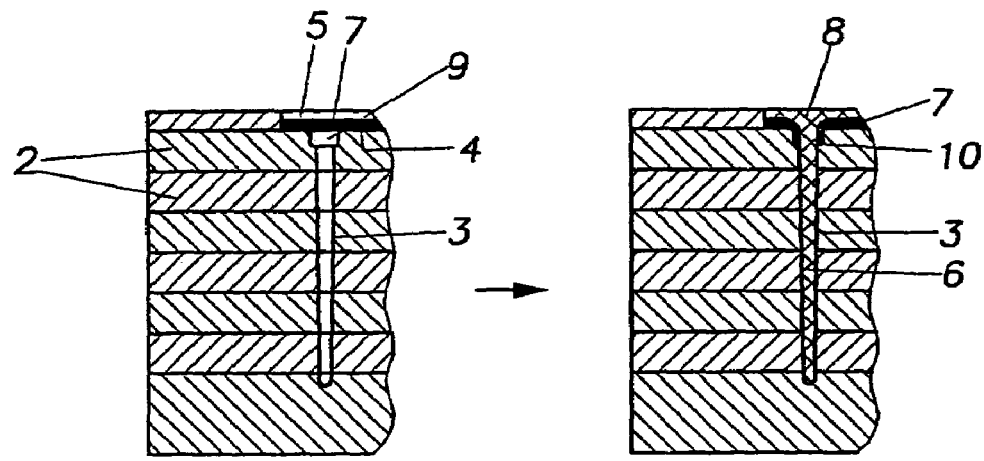
FIG. 3 shows a detailed view of FIG. 1.
FIG. 4 shows a detailed view of FIG. 2.

FIGS. 3 and 4 show a detailed variation with reference to a single mold channel 3. In this case, the mold channel 3 has an enlargement 9 disposed at the introductory side thereof into which the carrier material which is displaced when the carrier 7 is penetrated or shot through, flows, (FIG. 4). In this fashion, a collar 10 is formed within the enlargement 9 that supports the foot region of the bristles 6. For removal from the mold, the plates are displaced either individually or in groups such that the bristles 6 can be easily removed even in the event of substantial lengths.

FIGS. 5 through 7 show the introductory region of the channels 3 forming the bristles in enlarged, detailed view and illustrate its influence on the collar and the displacement of the carrier material during penetration of the mold mass. An entrance region having sharp edges (see FIG. 5) supports the breaking-through of the carrier material in the vicinity of the free cross-section 6 of the mold channel but also disadvantageously increases the probability that the carrier material is dragged along into the mold channel 3. In the event that the mold channel 3 has a more or less funnel shaped entrance in the vicinity of its free cross-section 6, the carrier material which is displaced by the mold mass under the influence of the mold pressure is evenly forced into the mold channel to form a proper collar. This improves the statics of the bristle produced thereby.

The embodiment in accordance with FIG. 8 shows a plan view onto the entrance region of the mold channel 3 which, at least in the vicinity of its free cross-section 6, has a corrugated shape as indicated by reference symbol 11. This shape supports penetration of the mold mass through the support 7. The structuring can extend along the entire length of the molding channel or can slowly map into a smooth-walled mold channel.

In accordance with FIG. 9, an additional carrier 12 having through holes 13 is initially disposed on the mold walls 4 from the which the mold channels 3 extend, with the actual carrier 7, which covers the molding channels 3 and the holes 13 being disposed thereon. The through holes 13 can have a somewhat larger diameter. In response to the mold pressure, the mold mass penetrates through the carrier 7 in the vicinity of the through holes 13 which then accept the displaced carrier material. The carriers 7 and 12 can preferentially be made from differing materials. For example, the carrier 12 can be made from a relatively soft elastomer and the carrier 7 from a harder material. Alternatively, the carrier 7 can also be directly disposed onto the mold walls 4 and a carrier similar to the carrier 12 can be disposed thereon. In this latter case as well, a hard/soft combination of material is conceivable.

Figure 10:
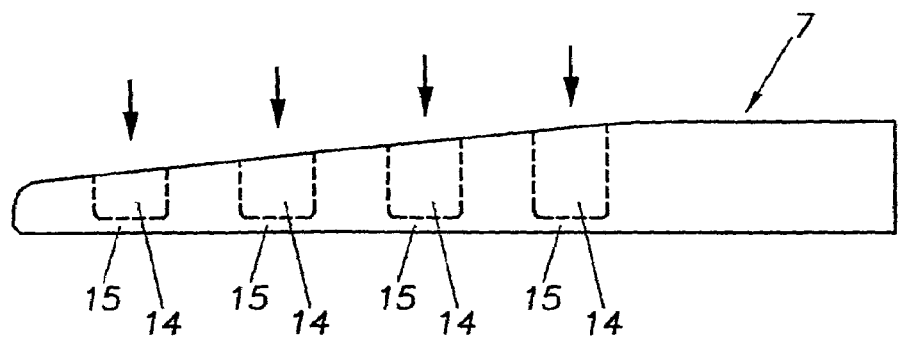
FIG. 10 is a schematic side view of a carrier for the head of a toothbrush.

FIG. 10 shows a carrier 7 which e.g. can be used for the production of the head region of a toothbrush. This carrier has a thickness which decreases along its length in order e.g. to provide progressive flexibility. However, in order to have uniform conditions when the mold mass is injected, the support 7 is provided with bottom holes 14 having a depth which is such that the wall thickness 15 through which the mold mass must penetrate or shoot always remains the same.

Figure 11:
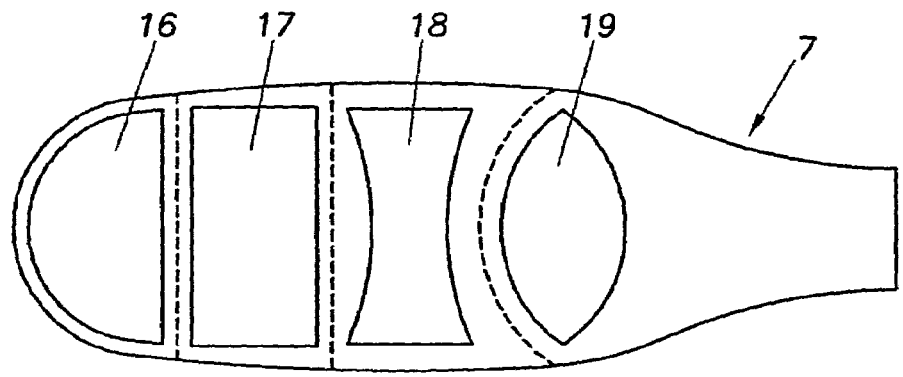
FIG. 11 is a view onto the bristles field of the head of a toothbrush.
Figure 12:
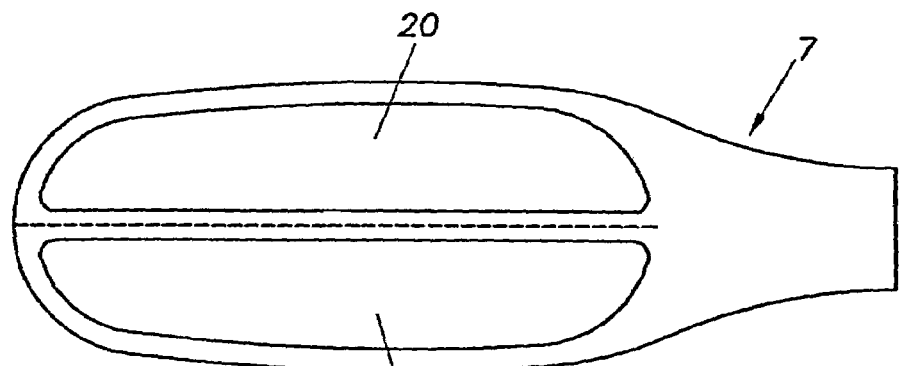
FIG. 12 is a view of another embodiment corresponding to FIG. 11.
Figure 13:
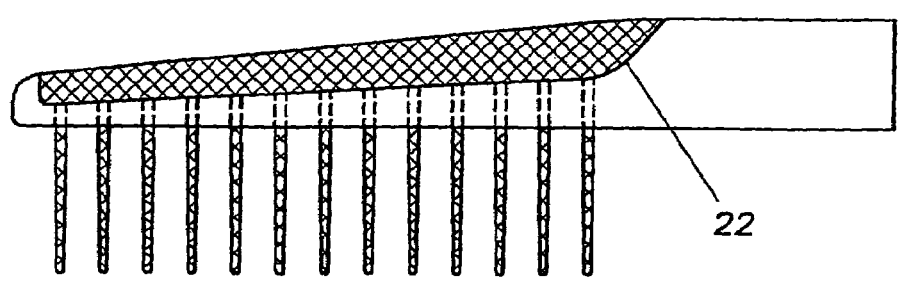
FIG. 13 is a partial cut through the head of a toothbrush in an additional embodiment.
Figure 14:
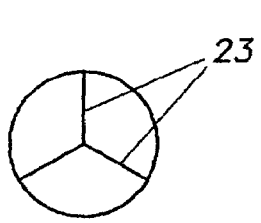
FIG. 14 shows a first embodiment of the configuration of intended breaking locations on the carrier, in plan view.
Figure 15:
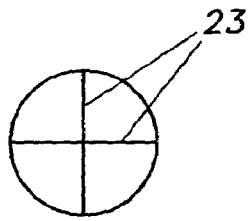
FIG. 15 shows a second embodiment of the configuration of intended breaking locations on the carrier, in plan view.
Figure 16:
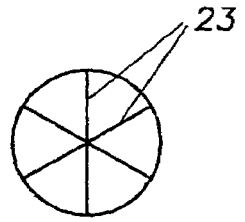
FIG. 16 shows a third embodiment of the configuration of intended breaking locations on the carrier, in plan view.

The bottom holes 14 or the cross-section 14 which is to be penetrated can optionally be respectively associated with a plurality of mold channels such that, as shown in FIGS. 11 and 12, a bristle stock having differently configured bristles fields 16, 17, 18, and 19 or longitudinally extending bristles fields 20, 21 (FIG. 11) can be obtained. As is shown in FIG. 13, the molding mass for the bristles filling the bottom holes 14 can also fill a continuous recess 22 formed on the back of the support 7, as is shown in FIG. 13.

Figure 17:
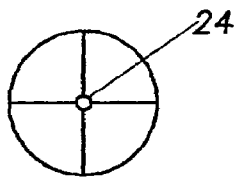
FIG. 17 shows a fourth embodiment of the configuration of intended breaking locations on the carrier, in plan view.

FIG. 14 through 17 show various embodiments for weakening the carrier 7 in the region of the free cross-section of the bristle forming channels. Each of such weakenings preferentially comprises radially symmetric intended breaking location 23 of differing configuration, wherein the central portion can optionally exhibit a particularly thin intended breaking location 24 (FIG. 17).

Figure 18:
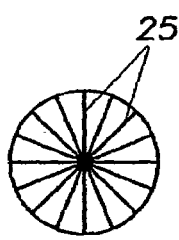
FIG. 18 is a plan view onto an embodiment having weakened locations in a foil of a carrier constituting a kind of stretching foil.
Figure 19:
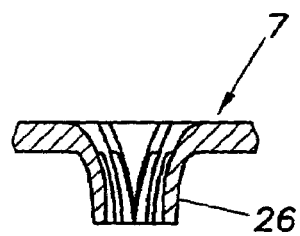
FIG. 19 is the embodiment of FIG. 18 after the effect of the molding pressure, in cross-section.

In the event of a thin carrier, in particularly stretching foils, a radially symmetric configuration of weakening lines 25 can be used to assure that the foil does not tear when the molding mass penetrates, rather stretches in a funnel-shaped fashion as is shown in FIGS. 18 and 19, so that a proper collar 26 is obtained. In the event of liquid melt mold masses e.g. in pressure molding or injection molding, both the breaking-open of the thinned locations as well as the stretching (see FIGS. 18 and 19) are supported by the temperature of the melt and the pressure wave which precedes the melt and which forces air out of the molding cavity. If, for example, the carrier is made from polypropylene having a melting temperature of 160 degrees and the bristle from polyamide 6.6 having a melting temperature of 260 degrees, it is clear that the temperature has a substantial influence on the breaking-through and displacement of the carrier material. Conversely, by proper matching of the two materials such that they both have nearly the same melting temperature, a melting and welding together of the carrier and bristle material can be effected.

Figure 20:
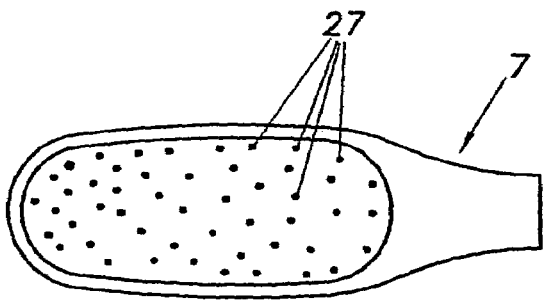
FIG. 20 shows a plan view onto a first embodiment of a carrier having a grid-like configuration of intended breaking locations.
Figure 21:
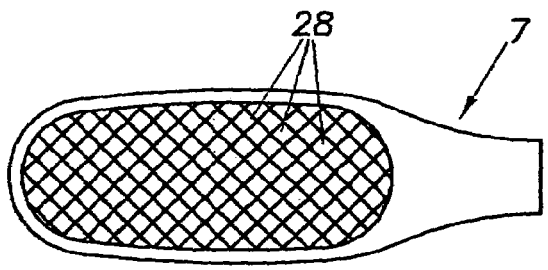
FIG. 21 shows a plan view onto a second embodiment of a carrier having a grid-like configuration of intended breaking locations.
Figure 22:
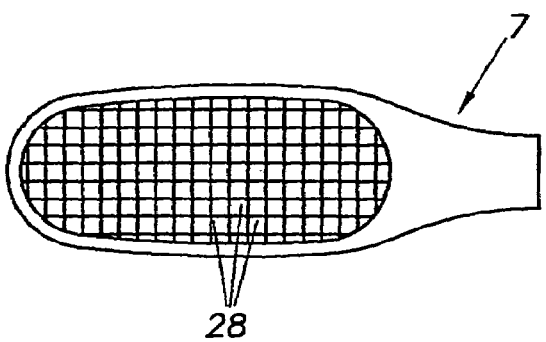
FIG. 22 shows a plan view onto a third embodiment of a carrier having a grid-like configuration of intended breaking locations.

Particularly in the event of a very dense pack of bristles, the carrier 7 can be configured with grid-like, point shaped intended breaking locations 27 (FIG. 20) or with intended breaking locations forming gridlines 28 (see FIGS. 21 and 22).

Figure 23:
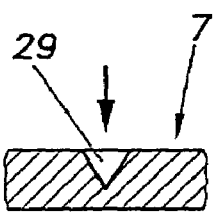
FIG. 23 shows a first embodiment of intended breaking locations on thick carriers, in cross-section.
Figure 24:
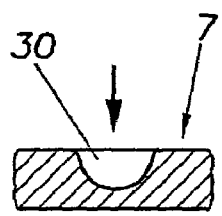
FIG. 24 shows a second embodiment of intended breaking locations on thick carriers, in cross-section.
Figure 25:
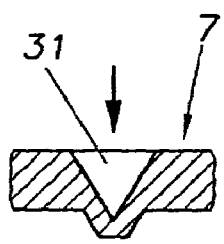
FIG. 25 shows a third embodiment of intended breaking locations on thick carriers, in cross-section.
Figure 26:
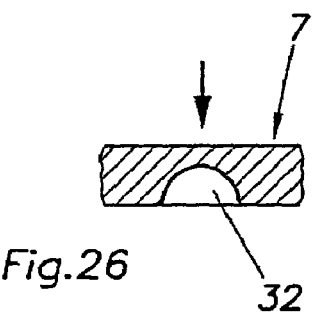
FIG. 26 shows a fourth embodiment of intended breaking locations on thick carriers, in cross-section.

FIGS. 23 to 30 show differing embodiments of intended breaking locations, in particular for thicker carriers. FIG. 23 shows a funnel shaped intended breaking locations 24 each of which is associated with a bristle shaping channel. FIG. 24 shows a trough-shaped intended breaking location 30 and FIG. 25 shows a funnel shaped intended breaking location 31 with a protrusion 32 on the opposite side. Such shaping supports proper collar formation. These intended breaking locations can be disposed on that side of the support 7 which faces the molding pressure or alternatively, as shown in FIG. 26, on the side facing away from the molding pressure. Dome-shaped intended breaking locations 32 are shown.

Figure 27:
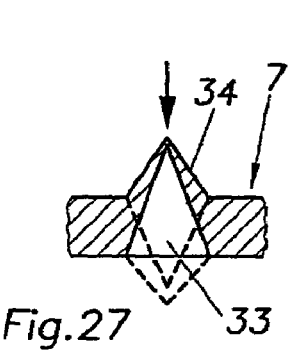
FIG. 27 shows a fifth embodiment of intended breaking locations on thick carriers, in cross-section.
Figure 28:
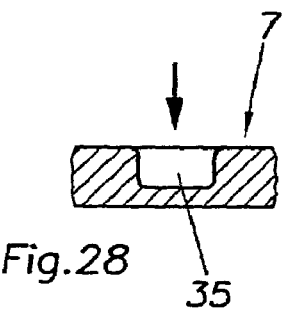
FIG. 28 shows a sixth embodiment of intended breaking locations on thick carriers, in cross-section.

In FIG. 27, the support 7 is given a funnel-shaped intended breaking location 33 at the side facing away from the mold pressure which extends, on the side facing the mold pressure, into a cone-shaped or pyramid-shape tip 34. In response to the molding pressure, the tip folds over in the direction towards the bristle shaping channel, as is indicated with the dashed lines. FIG. 28 shows a bowl-shaped intended breaking location 35.

Figure 29:
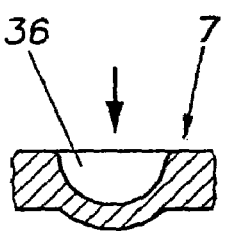
FIG. 29 shows a seventh embodiment of intended breaking locations on thick carriers, in cross-section.
Figure 30:
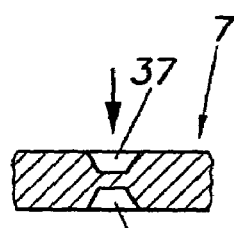
FIG. 30 shows an eigth embodiment of intended breaking locations on thick carriers, in cross-section.

The intended breaking location 36 in accordance with FIG. 29 deviates from that shown in FIG. 24 in that the carrier material is additionally bulged in the direction towards the bristle shaping channels. FIG. 30 illustrates the material-weakening of the carrier 7 from both sides, each due to a respective hollow 37 and 38.

Figure 31:
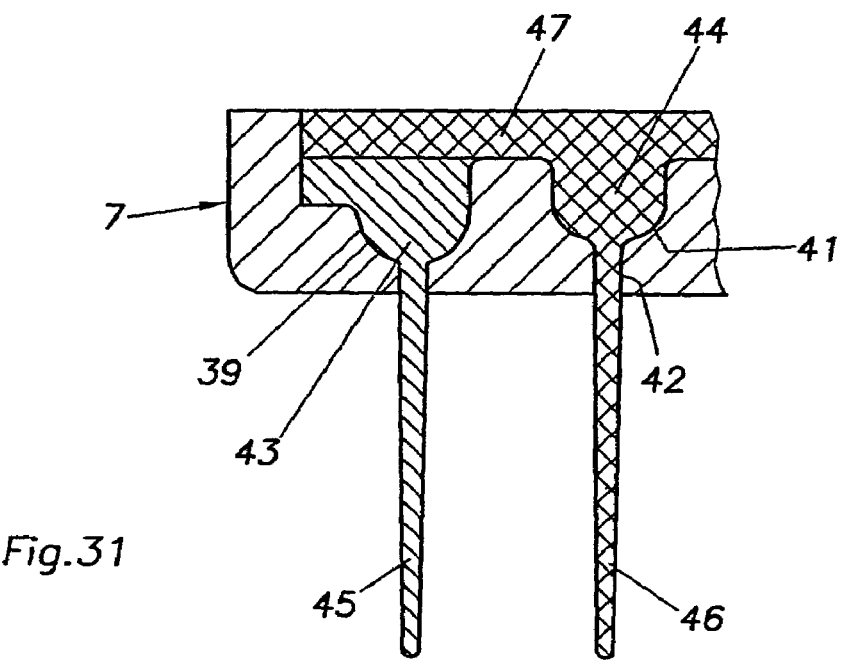
FIG. 31 schematically shows a section of a carrier having different intended breaking locations and differing mold masses.

FIG. 31 shows a carrier 7 having intended breaking locations leading to differing weakenings thereof. The dome-shaped recess 39 leaves a material bridge 40 of less thickness than the dome-shaped recess 41 so that a greater wall thickness 42 remains. In response to injection of a first mold mass 43 with a particular mold pressure, those locations having the lowest residual wall thickness 40 break. In response to subsequent injection of an additional mold mass 44 at a higher mold pressure, the intended breaking locations having greater residual wall thicknesses 42 also break. In this fashion, it is possible to produce bristles 45, 46 from differing plastic on one single carrier 7, wherein the last mold mass injected can simultaneously constitute the back of the carrier 47. The bristles 45, 46 can also have differing shapes and cross-sections and could even be used to generate panel-shaped cleaning elements.

The carrier 7 can have shoulders 48 disposed on its side facing the bristle shaping channel which can partially dip into the bristle shaping channel and which can have intended breaking location 49 on their ends so that the mold mass 49 introduced at the mold pressure initially fills the channel 50 in the shoulder 48 before it breaks through the intended breaking location 49 and penetrates into the mold channel to form the bristle 51. The bristle 51 is thereby wrapped within the shoulder 48 along an extensive length (FIG. 33).

The carrier in accordance with FIG. 34 also has a shoulder 52 with a bottom hole 53 whose floor has a plurality of thin locations (not visible). After the mold mass 54 is introduced, the bottom of the shoulder 52 tears at the thin locations to form short needle-shaped bristles 54 on a pin-shaped support.

FIG. 36 shows a schematic partial section of a two part molding tool 1 for use in the sandwich injection molding procedure. In this case, a mold mass 56 is initially introduced into the molding cavity 55 at a relatively low pressure such that the molding cavity 55 is not completely filled with the mold mass 56 seating on the mold walls. Due to the low mold pressure, the mold mass 56 is not able to overcome the flow resistance presented by the free cross-section of the bristle forming channels and therefore only penetrates into the region proximate the openings. This mold mass solidifies quickly at the cool mold walls and the second mold mass 57 can be subsequently injected. This second mass penetrates through the "plugs" formed by the first mold mass 56 in the vicinity of the opening cross-section and the "plugs" are thereby transformed into collars, as is shown in the shoulder region of the bristle 58 in FIG. 37.

Figure 38:
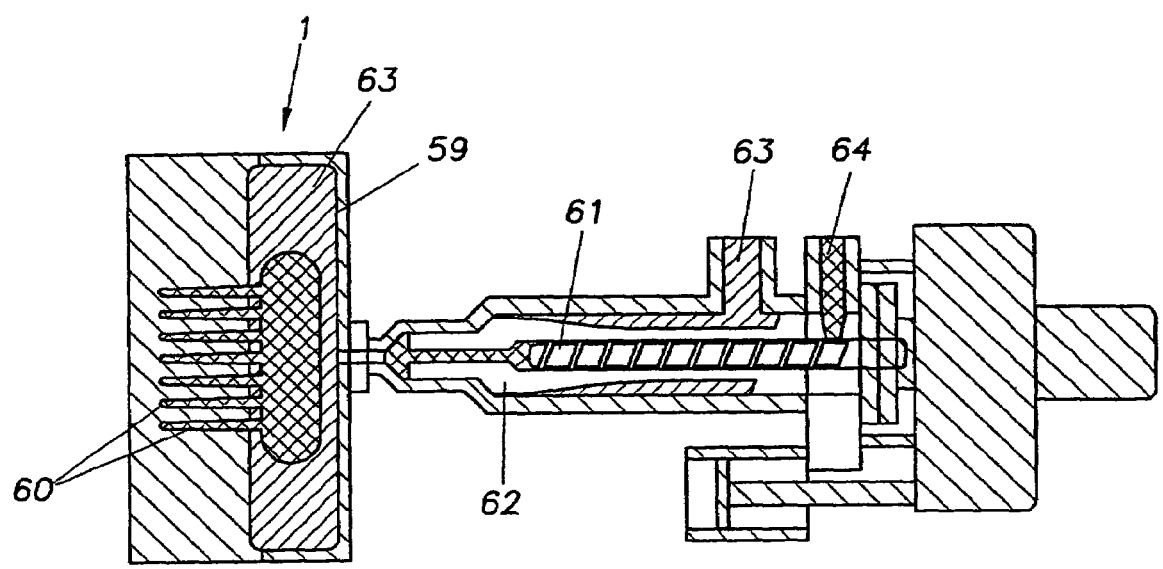
FIG. 38 is a schematic representation of a cut through an injection molding apparatus for use in the twin-shot procedure.

The sandwich injection molding procedure can be effected by means of one single injection screw or in accordance with the so-called twin-shot method using two concentric injection screws. This procedure is schematically shown in FIG. 38. One portion of the two-sided mold tool 1 having the mold cavity 59, e.g. for production of a complete brush body has the channels 60 for shaping the bristles. The injection molding device consists essentially of an inner injection screw 61 which is disposed within an external injection screw 62 and which penetrates through the injection channel of that outer screw 62. The mold mass 63 is introduced via the outer injection screw 62 and only partially fills the mold cavity 59. This is effected with relatively high screw injection pressure. However, in response to that injection, only a portion of the mold is filled up and the pressure in the mold cavity thereby drops to several tens of bars ($0.01 \times 10^5$ kPa) so that the mold mass 63 does not penetrate into the mold channel 60. In a subsequent step, the mold mass 64 is introduced in a second shot at a higher injection pressure. It is thereby injected in a mold-filling fashion and therefore has sufficiently high pressure within the mold cavity 59 to fill-up the mold channels 60.

The carrier can be injected using the GIT method (gas injection technology) or using the WIT procedure (water injection technology) that initially lead to a hollow mold body as a support from which the auxiliary fluid is subsequently removed. The resulting cavity can then be filled with a second mold mass, which simultaneously fills the channels forming the bristles. In this manner, brush bodies can be made using materials, which are tailored to their respective application.

Figure 39:
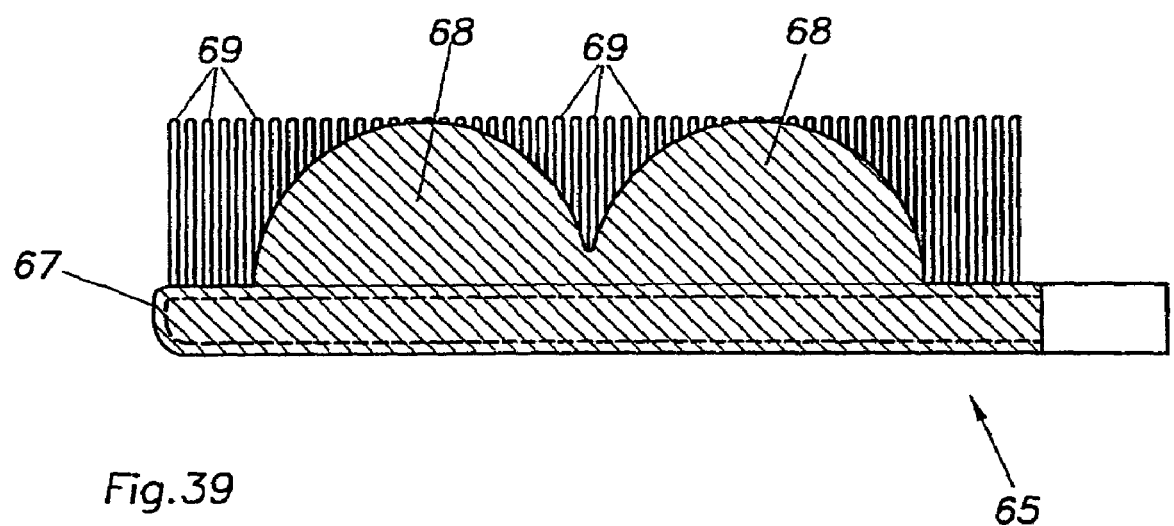
FIG. 39 shows the head of a toothbrush in longitudinal section.
Figure 40:
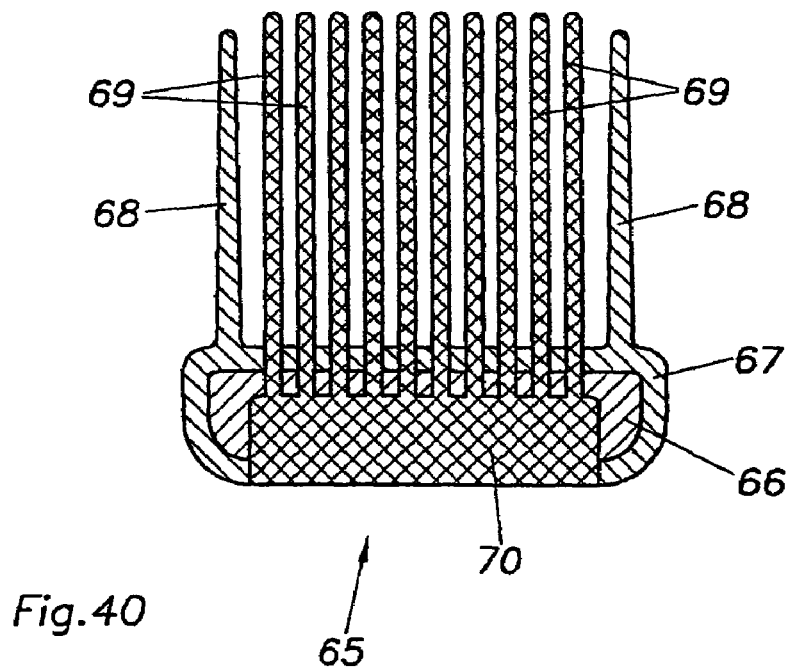
FIG. 40 shows the head of a toothbrush in transverse section.

An example is schematically shown in FIGS. 39 and 40 for the case of a toothbrush head 65, with FIG. 39 showing a longitudinal cut and FIG. 40 a transverse cut. The head consists essentially of a core 66 made from a relatively hard material, which is surrounded by a soft mucous membrane protection 67 which, for its part, is integral with blade-shaped cleaning and massaging elements 68 which are disposed on the side surface of the bristle stock having bristles 69. At the bristle back, the core 66 is filled up with the mold mass 70 forming the bristles 69. In this case, the mold mass for the bristle 69 is shot through the core 69 and the mucous membrane protection 67.

Single or multi-layered carriers of sufficient flexibility can be wrapped about rigid support structures in order to create round bristle elements. They can also be bent into structured objects, e.g. into U-shaped structures. They can also be shaped and bent into seals, in dependence on the application. These examples are only a few of all conceivable ones.

An example is shown in FIGS. 41 through 43. A star-shaped blank 71 made from a flexible carrier 72 (FIG. 43) is penetrated through by a mold mass for the bristles, in accordance with the invention. The mold mass can simultaneously form an additional layer 74. Holding elements 75 are formed on the ends of the strip-shaped carrier 72 and can be fixed to a handle or the like or joined together after the strip-shaped carrier is bent into a three-dimensional object, e.g. a spherical or pear shaped object. The three-dimensional active regions can thereby be expanded through arrangement of a plurality of such star-shaped objects offset at angles with respect to each other, as indicated by the reference number 76, and connected to each other in a central region.

I claim:

1. A method of production of a bristle product comprising a carrier body having monofilament bristles using a mold tool, the mold tool having channels for shaping and fixing the bristles to the carrier body, wherein the carrier body serves to permit a user to move the bristles in use, wherein, during injection or pressure molding, melt is introduced into the channels under pressure for forming the bristles, the method comprising the steps of:
    a) prefabricating the carrier body to fit to edges of the mold tool;
    b) disposing the carrier body in the mold tool upstream of the channels in such a fashion that a free cross-section of the channels is fully covered; and
    c) introducing, following step b), the melt with a sufficiently high mold pressure as to shoot-through the carrier body in a vicinity of the free cross-section of the channels thereby displacing carrier material, with the melt subsequently filling the channels, wherein the carrier body acts as a pressure holding barrier during injection molding of the melt up to a point in time at which penetration of the melt through the carrier body begins with the melt subsequently penetrating explosively into the channels to form the monofilament bristles and evenly displace carrier material around a foot of the bristles to fix the carrier body to the monofilaments.

2. The method of claim 1, wherein carrier material, which is displaced by the melt upon penetration through the carrier body, is at least partially displaced into openings of the channels.

3. The method of claim 1, wherein carrier material, which is displaced upon penetration of the melt through the carrier body, is shaped into a collar projecting into openings of the channels.

4. The method of claim 1, wherein carrier material, which is displaced by penetration of the melt through the carrier body, is shaped to generate a funnel-shaped hole.

5. The method of claim 1, wherein the channels forming the bristles have an enlargement in a vicinity of their openings for acceptance of carrier material to generate a collar.

6. The method of claim 1, wherein carrier material, which is displaced by the melt upon penetration through the carrier material, forms an alloy together with said melt.

7. The method of claim 1, wherein, prior to introduction onto walls of the mold, regions of the carrier covering openings in the channels are given materially weakened structures or have materially weakened structures.

8. The method of claim 7, wherein radially symmetric intended breaking locations are introduced onto the carrier body.

9. The method of claim 1, wherein prior to introduction of the carrier body onto mold walls, the carrier body is provided with a thickness in regions covering openings in the channels which is reduced compared to a thickness in remaining regions.

10. The method of claim 1, wherein at least one additional carrier, having aligned holes, is introduced into the molding tool upstream of the channels, wherein the carrier through which the melt penetrates is placed onto the additional carrier body to cover the holes.

11. The method of claim 1, wherein the additional carrier, having aligned holes, is introduced into the molding tool upstream of the channels and the carrier, which is to be penetrated by the melt, is disposed between the additional carrier and openings in the channels.

12. The method of claim 1, wherein the carrier body consists essentially of an organic or inorganic material.

13. The method of claim 1, wherein the carrier body acts as a pressure-holding barrier up to an internal mold pressure of between 1000 to 5000 bar.

14. The method of claim 1, wherein the carrier body is made from a foil.

15. The method of claim 14, wherein the foil is stretched.

16. The method of claim 14, wherein the carrier body is made from a metallic foil.

17. The method of claim 14, wherein the carrier body is made from a plastic foil.

18. The method of claim 17, wherein the carrier body is made from an elastomer foil.

19. The method of claim 14, wherein the foil has a thickness of preferentially $\leq 1$ mm.

20. The method of claim 1, wherein the carrier body is made from a plate.

21. The method of claim 20, wherein the plate has a thickness of $\geq 0.2$ mm.

22. The method of claim 1, wherein the carrier body is formed from two or more layers.

23. The method of claim 22, wherein at least one layer covers openings in the channels and at least one additional layer is provided with holes in correspondence with a configuration of the channels.

24. The method of claim 22, wherein the two or more layers are made from differing materials.

25. The method of claim 22, wherein the two or more layers have differing elasticities.

26. The method of claim 1, wherein the carrier body is introduced as a pre-fabricated, blown molded component.

27. The method of claim 1, wherein the carrier body is introduced as a pre-fabricated, injection molded component.

28. The method of claim 1, wherein the carrier body is introduced as a pre-fabricated, deep drawn component.

29. The method of claim 1, wherein the carrier body is introduced into a open mold tool as endless material and is cut to proper length prior to closing the mold tool.

30. The method of claim 1, wherein the carrier body having a desired size is introduced onto an endless support and is separated from the support in a vicinity of the mold tool.

31. The method of claim 1, wherein material of the carrier body covering the free cross-section of the channels can be welded to material of the bristles.

32. The method of claim 1, wherein plastics having differing mechanical properties and leading to formation of the bristles are introduced into the mold tool in sections.

33. The method of claim 1, wherein bristle-forming plastics having differing colors are introduced into the mold tool in sections.

34. The method of claim 1, wherein the carrier body is introduced into the mold tool in the form of a raw material or as a blank and is shaped onto a mold wall surrounding the free cross-section of the channels in response to the mold pressure of the melt generating the bristles and prior to the point in time at which the melt penetrates through the shaped carrier.

35. The method of claim 1, wherein the carrier body is introduced into the mold tool in the form of a raw material or as a blank and is subjected to fluid pressure in response to which it is shaped on mold walls surrounding the free cross-section of the channels and prior to a point in time at which the melt is introduced into the mold tool at a higher mold pressure.

36. The method of claim 1, wherein the carrier body and the melt forming the bristles are introduced into the mold tool using a sandwich injection molding procedure.

37. The method of claim 36, wherein the sandwich injection molding procedure is carried out as a single shot or twin-shot procedure.

38. The method of claim 1, wherein the carrier body is preformed using a GIT method (gas injection technology) or is introduced into the molding tool with subsequent injection of the melt for the bristles.

39. The method of claim 1, wherein the carrier body is preformed using a WIT method (water injection technology) or is introduced into the mold tool and the melt for the bristles is subsequently injected.

* * * * *